(12) United States Patent
Klapfenberger (10) Patent No.: US 12,170,393 B2
(45) Date of Patent: Dec. 17, 2024

(54) POLARIZER FOR A WAVEGUIDE AND SYSTEM FOR THE TRANSMISSION OF HIGH-FREQUENCY ELECTROMAGNETIC SIGNALS

(71) Applicant: Rosenberger Hochfrequenztechnik Gmbh & Co. KG, Fridolfing (DE)

(72) Inventor: Raimund Klapfenberger, Palling (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 1081 days.

(21) Appl. No.: 17/049,540

(22) PCT Filed: Apr. 23, 2019

(86) PCT No.: PCT/EP2019/060339
§ 371 (c)(1),
(2) Date: Oct. 21, 2020

(87) PCT Pub. No.: WO2019/206890
PCT Pub. Date: Oct. 31, 2019

(65) Prior Publication Data
US 2021/0181418 A1    Jun. 17, 2021

(30) Foreign Application Priority Data

Apr. 25, 2018  (EP) ..................... 18169182

(51) Int. Cl.
*H01P 1/165* (2006.01)
*H01P 1/17* (2006.01)
(Continued)

(52) U.S. Cl.
CPC ............... *H01P 1/165* (2013.01); *H01P 1/17* (2013.01); *H01P 3/10* (2013.01); *H01P 3/127* (2013.01); *H01P 3/16* (2013.01)

(58) Field of Classification Search
CPC .... H01P 1/165; H01P 1/17; H01P 3/10; H01P 3/127; H01P 3/16; H01P 3/12; G02B 6/2766
See application file for complete search history.

(56) References Cited

U.S. PATENT DOCUMENTS 2,546,840 A    3/1951  Tyrrell
5,576,668 A   11/1996  Clark
(Continued)

FOREIGN PATENT DOCUMENTS

JP      H05299901 A    11/1993
JP        5439093 B2    3/2014
WO   WO-2015182243 A1 * 12/2015   ............... H01P 1/17

OTHER PUBLICATIONS

Office Action issued by the State Intellectual Property Office of China dated Sep. 3, 2021.
(Continued)

*Primary Examiner* — Andrea Lindgren Baltzell
*Assistant Examiner* — Kimberly E Glenn
(74) *Attorney, Agent, or Firm* — Randall Danskin P.S.

(57) ABSTRACT

A polarizer for a waveguide, comprising a main body for transmitting an electromagnetic wave, a first delay member being provided in the main body. A second delay member arranged downstream of the first delay member in the working direction (A) of the electromagnetic wave is provided in the main body, and the polarization axis ($P_2$) of the second delay member is rotated relative to the polarization axis ($P_1$) of the first delay member by a delay angle ($\beta$).

18 Claims, 2 Drawing Sheets

(51) Int. Cl.
  *H01P 3/10*  (2006.01)
  *H01P 3/127*  (2006.01)
  *H01P 3/16*  (2006.01)

(56) References Cited

U.S. PATENT DOCUMENTS

| | | |
|---|---|---|
| 7,034,774 B2 | 4/2006 | Kuo et al. |
| 9,939,585 B1 | 4/2018 | Monte |
| 2003/0227344 A1 | 12/2003 | Kovac |
| 2011/0158579 A1 | 6/2011 | Little |
| 2016/0172732 A1 | 6/2016 | Adams |
| 2022/0190477 A1* | 6/2022 | Girard .................... H01P 3/123 |

OTHER PUBLICATIONS

Summons to attend oral proceedings issued by the European Patent Office, dated Apr. 9, 2021.
European Search Report 18169182.5 Oct. 24, 2018.
International Search Report PCT/EP2019/060339 Jul. 19, 2019.
European Office Action 18 169 182.5 Aug. 18, 2020.
Polarization stabilization on single-mode fiber, Applied Physics Letters 35, No. 11, pp. 840-842, Dec. 1, 1979.

* cited by examiner

POLARIZER FOR A WAVEGUIDE AND SYSTEM FOR THE TRANSMISSION OF HIGH-FREQUENCY ELECTROMAGNETIC SIGNALS

CROSS REFERENCE TO RELATED APPLICATIONS

This application is a United States National Patent Application which claims the benefit of priority to earlier filed European Patent Application No. 18 169 182.5, filed on 25 Apr. 2018 and titled "Polarizer for a Waveguide and System for the Transmission of High-Frequency Electromagnetic Signals". This United States National Patent Application also claims the benefit of priority to earlier filed PCT Patent Application No. PCT/EP2019/060339 filed on 23 Apr. 2019 and titled "Polarizer for a Waveguide and System for the Transmission of High-Frequency Electromagnetic Signals". The entire contents of the aforementioned earlier filed European Patent Application and the earlier filed PCT Patent Application are both expressly incorporated herein by this reference. Pursuant to USPTO rules, this reference to earlier filed European Patent Application No. 18 169 182.5, and to earlier filed PCT Patent Application No. PCT/EP2019/060339 is also included in the Application Data Sheet (ADS) filed herewith.

TECHNICAL FIELD

The invention relates to a polarizer for a waveguide with a base body for the transmission of an electromagnetic wave.

The invention also relates to a waveguide for the transmission of an electromagnetic wave.

The invention moreover relates to a system for the transmission of high-frequency electromagnetic signals, comprising a first antenna arrangement for feeding the electromagnetic wave to a base body of a first polarizer, as well as a system for receiving high-frequency electromagnetic signals comprising a second antenna arrangement for receiving the electromagnetic wave at a base body of a second polarizer.

BACKGROUND

A polarizer of this generic type and a system of this generic type are described in US 2016/0172732 A1.

It is known that the transmission of signals over conventional electrical conductors such as, for example, copper conductors in electrical cables, is subject to heavy signal attenuation at high frequencies. As a result, in particular when high requirements are placed on the transmission bandwidth, a high expense is sometimes necessary in order to achieve the specifications if this is at all possible. This applies in particular when large transmission distances must be covered and only a small number of data channels or transmission lines are available.

Radio-based transmission, i.e. transmission using electromagnetic waves, can be an alternative to electrical signal transmission. However, when electromagnetic waves propagate in all directions in space, their signal power falls quadratically with distance. In a waveguide, on the other hand, electromagnetic signals can, ideally, be transmitted over large distances along only one dimension with low losses.

A waveguide here refers to any structure, in particular a linear structure, that is able to guide electromagnetic waves between end points. Waveguides for electromagnetic waves are already known in electronic engineering, in particular in telecommunications technology and high-frequency technology.

Electromagnetic signals can be transmitted via a waveguide over long distances with relatively little expense and comparatively low losses. Waveguides can accordingly be advantageously employed where high requirements are placed on the transmission bandwidth and/or transmission distance of a wired communication.

Although signal transmission over a waveguide is fundamentally advantageous, it has been found in practice that high signal losses sometimes occur at the connecting location at which the electromagnetic signal is coupled from an antenna arrangement into the waveguide or is received from an antenna arrangement if the waveguide and the antenna arrangement are not optimally aligned to one another for the feed and reception of the electromagnetic wave. This applies in particular for dielectric waveguides and the transmission of a linearly polarized electromagnetic wave. It has been found in practice that even with exceptionally painstaking assembly, signal loss can occur as a result of polarization axes of the components involved in the system not being aligned with sufficient accuracy, due in part to mechanical stress torsional stress in particular on the components during operation.

One possibility for circumventing the problem is described, for example, in US 2016/0172732 A1. US 2016/0172732 A1 relates to circular polarizers and their application to waveguides, wherein an electromagnetic wave that initially has linear polarization is circularly polarized by the circular polarizer for further transmission through the waveguide.

It has, however, been found that the signal bandwidth achievable by the system described in US 2016/0172732 A1 is too limited for many applications.

The present invention provides an improved polarizer for a waveguide, with which, in particular, a high bandwidth with low coupling losses can be achieved.

The present invention is an improved waveguide through which electromagnetic waves can be transmitted with low losses and a high bandwidth.

The invention is furthermore an improved system for the transmission of high-frequency electromagnetic signals with high bandwidth that comprises a waveguide for the low-loss transmission of an electromagnetic wave.

The invention is furthermore an improved system for receiving high-frequency electromagnetic signals with high bandwidth that comprises a waveguide for the low-loss transmission of an electromagnetic wave.

The invention is a polarizer for a waveguide with a base body for the transmission of an electromagnetic wave wherein a first delay element is provided in the base body.

A second delay element is provided in the base body downstream of the first delay element in the direction of propagation of the electromagnetic wave and, wherein the polarization axis of the second delay element is rotated through a delay angle with respect to the polarization axis of the first delay element.

The polarizer has, in particular, the purpose of affecting the polarization type of a linearly polarized electromagnetic wave, that is fed in prior to transmission through the waveguide, in particular to generate a rotating polarization, i.e. a circular or elliptical polarization, from a linear polarization. The polarizer can, moreover, also serve to affect the polarization type of an electromagnetic wave that is to be received with rotating (circular or elliptical) polarization prior to reception, in particular to generate a linear polarization.

A conversion between a linear and a circular polarization is preferably provided, since an elliptical polarization is a mixed form of a linear and a circular polarization, for which reason the advantages according to the invention are particularly beneficial in a circular polarization.

In contrast to the prior art, in which a single delay element, for example what is known as a delay plate rotated through 45° with respect to the polarization axis of the incoming electromagnetic wave, it is a particular advantage of the present invention that the polarization of the electromagnetic wave is affected using serial delay elements, i.e. arranged behind one another, wherein advantageously a first delay element initially only causes a small rotation of the polarization, and a second delay element then causes the remaining rotation, in order to bring about the transition between linear and, in particular, circular polarization of the electromagnetic wave.

The alignment, and thus in particular the bandwidth, of a transmitted electromagnetic signal can, be improved in comparison with the prior art. The electromagnetic wave can, for example, have a center frequency of between 40 GHz and 150 GHz, preferably 125 GHz. The possible frequency range, however, is in fact only restricted by the mechanical manufacturability of the polarizer, and is not otherwise upwardly limited according to the invention. A faster data transmission can thus be provided according to the invention.

Further delay elements arranged behind one another in the direction of propagation of the electromagnetic wave can also be provided in the base body, for example a third delay element, a fourth delay element, a fifth delay element, a sixth delay element or even more delay elements that distribute the required total rotation of the polarization between themselves. The invention is thus not fundamentally to be understood as restricted to the use of two delay elements, although the invention is however particularly suitable for use with two delay elements at each polarizer. Solely for the sake of better understanding, the invention will be described below largely with reference to a first delay element and a second delay element arranged following the first delay element, but the invention is not limited thereto.

Preferably the delay elements are spaced apart from one another along the direction of propagation of the electromagnetic wave, and the distance between the delay elements can be arbitrary.

The rotation, or the direction of rotation, of the circular polarization (right-circular or left-circular) can be adjusted depending on the arithmetic sign of the delay angles of the delay elements. The direction of rotation of the circular polarization can also be determined through the alignment or excitation of the linear polarization. A rotation of the linear polarization through 90° can lead to a change between right-circular or left-circular polarization here.

The base body can be an elongated component whose longitudinal axis is aligned in the direction of propagation of the electromagnetic wave.

The base body can be designed as a single piece or as multiple pieces; preferably the base body is designed as a single-piece, such as an injection-molded part.

It can be provided in a development of the invention that the base body has an essentially round cross-section.

A round cross-section can be particularly suitable for the transmission of the electromagnetic wave, in particular with respect to the transmission of a circularly polarized wave.

The invention can, however, fundamentally also be suitable for a base body with an elliptical, rectangular or other cross-section.

The signal transmission can take place practically independently of torsion or other mechanical stress, or of alignment errors, and thus without significant power loss, in particular through the use of a base body with an essentially round cross-section together with the transmission of a circularly polarized electromagnetic wave through the base body.

It can further be provided in a development that the base body is designed as a dielectric waveguide, hollow waveguide or single-wire waveguide. This also applies to the waveguide with which the polarizer is to be used.

It can be provided that the polarizer and the waveguide are designed as a single piece. The polarizer and the waveguide can, however, also be designed as multiple pieces, wherein the polarizer couples the electromagnetic wave from its output end into an input end of the waveguide with as little loss as possible, or wherein the waveguide couples the electromagnetic wave from its output end into an input end of the polarizer with as little loss as possible.

In a development of the invention it can be provided that the first delay element and/or the second delay element has, or have, a cross-section that differs from the cross-section of the base body, preferably being smaller.

The design of a delay element through a change in the cross-section can advantageously affect the polarization of an electromagnetic wave passing through the delay element, for example through double refraction(s) and/or reflection(s).

When reference is made in the context of the invention to the first and/or the second delay element, this fundamentally includes the optional possibility that yet more delay elements, for example a third, fourth, fifth and and/or sixth delay element (or more), can also be present and can be designed analogously.

In one preferred development of the invention it can be provided that the first delay element and/or the second delay element is, or are, designed as a single piece with the base body.

In particular, although not exclusively, in the case of the design of the delay elements through a change in the cross-section of the base body, it can be advantageous for the delay element, or elements, to be designed as a single piece with the base body. The delay elements and the base body can, however, also be designed as multiple pieces.

In a further development it can, moreover, be provided that the first delay element and/or the second delay element is, or are each, formed of at least one recess, preferably a flattened area, in the base body.

In particular, when a base body with an essentially round cross-section is provided, flattened areas in certain regions can be particularly suitable for introducing appropriate reductions in the cross-section of the base body.

Alternatively, or in addition to flattened areas, notches and/or tapering regions can also be provided.

The delay elements can, for example, be created through tapering in a round hollow waveguide and/or through tapering or recesses in a dielectric which, when appropriate, can also be introduced into a round hollow waveguide.

It can also be provided that a recess in a dielectric base body is filled with a further dielectric whose permittivity differs from that of the base body.

The delay elements can differ in design from every point of view. The first delay element can, for example, be designed as a single piece with the base body, and the second delay element be designed as an intermediate piece or vice versa. The varieties of the changes to the cross section (recess/flattened area/notch/taper etc.) can also differ between the delay elements. Preferably, however, delay elements of the same type, although with different alignments and geometrical dimensions, are used within one polarizer, whereby the manufacture can be simplified.

An arbitrary number of recesses can be provided for each delay element, arranged in particular along the circumference of the base body, for example two recesses, three recesses, four recesses or even more recesses. The use of only a single recess in each delay element can also be possible in the context of the invention.

In one development it can, in particular, be provided that the first delay element and/or the second delay element is, or are, formed of two recesses lying opposite one another along the circumference of the base body, wherein the two opposing recesses are aligned orthogonally to the polarization axis of the delay element.

It can fundamentally be provided that when a plurality of recesses distributed along the circumference of the base body are used for each delay element, the respective recesses are aligned symmetrically with respect to the polarization axis of the respective delay element. The symmetrical arrangement can thus also be advantageous when more than two recesses are used for each delay element.

In one advantageous development of the invention it can be provided that the at least one recess has a first transition region along the direction of propagation of the electromagnetic wave in which the cross-section of the base body falls, followed by a central region in which the cross-section of the base body is constant, followed by a second transition region in which the cross-section of the base body rises.

The use of transition regions can improve the alignment of the polarizer and thus the signal transmission. In particular, when the base body and/or the polarizer is embodied as a dielectric, the return loss can, for example, be improved by the transition regions. Inter alia, however, when a metal base body and/or polarizer is used, a transition region can also be omitted. The transition can also be designed with a sharp edge. The use of transition regions is fundamentally optional and is also independent of the nature of the base body or of the polarizer.

The transition regions can, for example, be designed in the form of bezels, ramps or chamfers. The profile of the change in the cross-section in the transition regions can be linear or can follow an arbitrary curve, preferably a monotonically falling or rising curve.

In a further development of the invention it can also be provided that the length of the first delay element and the length of the second delay element differ in the direction of propagation of the electromagnetic wave.

It can in, particular, be advantageous to specify the lengths of the delay elements depending on the angle of tilt of their polarization axes relative to the polarization axis of the linearly polarized electromagnetic wave entering into the polarizer. In a complementary manner the lengths of the delay elements can also be specified depending on the angle of tilt of their polarization axes relative to the polarization axis of the linearly polarized electromagnetic wave emerging from the polarizer.

It can, in particular, be provided that the delay elements are made longer as the angular difference between their polarization axis and the polarization axis of the electromagnetic wave entering into the polarizer, or emerging from the polarizer, becomes smaller, in order to provide an adequate transmission path in the delay element for rotation of the polarization of the electromagnetic wave.

The type, geometry and/or alignment of the delay elements can fundamentally be determined through simulations and/or experimental series.

It can be provided that the polarizer comprises a metal sleeve that contains the base body, at least in the region of the delay elements, preferably completely. The base body can also consist of a metal sleeve.

It can, in particular, be provided that a substantially dielectric base body can be inserted into an enclosing metal cylinder. The metal housing, or the metal cylinder, can follow the changes in the cross-section of the base body to form the delay elements, in particular the recesses in the base body, or alternatively also may only enclose it, in order to enable an air gap or the possibility of inserting an additional dielectric into the recesses.

The invention also relates to a waveguide for the transmission of an electromagnetic wave comprising at least one polarizer.

The waveguide can preferably comprise two polarizers, wherein a first polarizer is arranged at a first end of the waveguide and is designed to change the polarization type of an electromagnetic wave fed into the first polarizer from a linear polarization to a circular or elliptical polarization for subsequent transmission through the waveguide, and wherein the second polarizer is arranged at a second end of the waveguide and is designed to change the polarization type of the electromagnetic wave transmitted through the waveguide into a linear polarization.

The waveguide can be designed as a single piece or as multiple pieces with the first and/or the second polarizer.

The invention moreover relates to a system for the transmission of high-frequency electromagnetic signals, comprising a waveguide for the transmission of an electromagnetic wave and a first antenna arrangement for feeding the electromagnetic wave into a base body of a first polarizer. The first polarizer is arranged and designed to convert the electromagnetic wave that is fed in from a linear polarization to a circular polarization, wherein a first delay element is provided in the base body of the first polarizer, whose polarization axis is rotated through a delay angle with respect to the polarization axis of the electromagnetic wave fed from the first antenna arrangement into the base body of the first polarizer. The system moreover provides a second delay element in the base body downstream of the first delay element in the direction of propagation of the electromagnetic wave, wherein the polarization axis of the second delay element is rotated through a delay angle with respect to the polarization axis of the first delay element.

The first polarizer is preferably arranged between the first antenna arrangement and the waveguide, but can also, however, be integrated into the waveguide.

The polarizer can thus be used in an advantageous manner for changing the polarization type of the electromagnetic wave that is fed in from a linear polarization to a circular polarization (or vice versa).

Because the first antenna arrangement (or the second antenna arrangement described below) does not necessarily have to be designed to transmit or to receive a circularly polarized electromagnetic wave directly, an extended bandwidth can be made available for signal transmission, since the known antenna arrangement for the transmission and for receiving a circularly polarized electromagnetic wave usually has a comparatively restricted bandwidth. The use of linearly polarized antenna arrangements in combination with the polarizers, according to the invention, for the conversion of the polarization type can thus be advantageous.

According to the invention, through the use of the at least two delay elements in each polarizer, an almost ideal circular polarization can be generated through the uniform distribution of the x-components and y-components of the electromagnetic oscillation.

In one development, the system also comprises a second antenna arrangement and a second polarizer, wherein the second antenna arrangement is provided for receiving the electromagnetic wave at a base body of the second polarizer, wherein the second polarizer follows the first polarizer in the direction of propagation of the electromagnetic wave, and is designed to convert the electromagnetic wave transmitted through the waveguide from the circular polarization to a linear polarization. A third delay element is provided in the base body of the second polarizer, whose polarization axis is rotated through 90° with respect to the polarization axis of the first delay element of the first polarizer, and wherein a fourth delay element, whose polarization axis is rotated through 90° with respect to the polarization axis of the second delay element of the first polarizer, is provided in the base body of the second polarizer upstream of the third delay element in the direction of propagation of the electromagnetic wave.

The second polarizer is preferably arranged between the waveguide and the second antenna arrangement, but can also, however, be integrated into the waveguide.

A solution that enables an advantageous transmission of a circularly polarized electromagnetic wave through a waveguide is enabled through the system. Due to the change in the polarization type of the electromagnetic wave at the input and output ends by the polarizers, antenna arrangements can be used in an advantageous manner for transmitting or receiving linearly polarized electromagnetic waves, whereby the bandwidth of the electromagnetic signals that can be transmitted by means of the system can be improved, in particular in respect of the otherwise necessary use of antenna arrangements for transmitting or receiving circularly polarized electromagnetic waves.

Due to the circular polarization it is advantageously moreover no longer necessarily required that the antenna arrangements for transmitting and receiving the electromagnetic wave are aligned with the same orientation with respect to one another.

In a further development it can be provided that the length of the first delay element and the length of the second delay element in the direction of propagation of the electromagnetic wave is determined depending on the delay angle of the respective delay element, wherein the length of the delay elements falls with rising delay angle, preferably being determined in inverse proportion to the delay angle.

When designing the system, consideration can in particular be given to the fact that an initial, slight rotation of the polarization of the electromagnetic wave by means of a first delay element with only a small delay angle can require a comparatively long first delay element and ultimately also a polarizer correspondingly long in design. On the other hand, losses in the signal transmission can be reduced in this way. An appropriate matching of the system to the respective application and prevailing conditions can, if appropriate, be performed by a person skilled in the art.

In one further development it can be provided that the sum of the delay angle of the first delay element and the delay angle of the second delay element yields an overall delay angle of 90°, wherein the delay angle of the first delay element is 1° to 45°, preferably 5° to 25°, and particularly preferably 15°, and the delay angle of the second delay element is 1° to 89°, preferably 65° to 85°, and particularly preferably 75°.

The delay angle of the second delay element, considered in relation to the polarization axis of the electromagnetic wave entering into the first delay element, can preferably be greater than 45°.

The above explanations can preferably also apply analogously to the third and fourth delay elements.

The invention also relates to a system for receiving high-frequency electromagnetic signals, comprising a waveguide for the transmission of an electromagnetic wave and a second antenna arrangement for receiving the electromagnetic wave at a base body of a second polarizer. The second polarizer is designed to convert the electromagnetic wave transmitted through the waveguide from a circular polarization to a linear polarization, wherein a third delay element is provided in the base body of the second polarizer, whose polarization axis is rotated through a delay angle with respect to the polarization axis of the linearly polarized electromagnetic wave emerging from the second polarizer. The system, according to the invention, provides a fourth delay element in the base body of the second polarizer upstream of the third delay element in the direction of propagation of the electromagnetic wave, wherein the polarization axis of the fourth delay element is rotated through a delay angle with respect to the polarization axis of the third delay element.

The second polarizer is preferably arranged between the waveguide and the second antenna arrangement, but can also, however, be integrated into the waveguide.

The invention finally also relates to the use of a polarizer for a waveguide.

Using two or more delay elements, whose polarization axes are rotated with respect to one another and with respect to the polarization axis of the original, linearly polarized, electromagnetic wave, a circular or elliptical polarization can be generated from a linearly polarized electromagnetic wave that is propagating, for example, through a round hollow waveguide or a dielectric waveguide or vice versa.

The polarizer according to the invention can in particular be suitable for systems for the transmission and reception of high-frequency electromagnetic signals for the automobile industry or for vehicles. Sometimes, for example, during the autonomous operation of a vehicle, or during the use of assistance systems, high quantities of data from multiple cameras, various sensors and navigation sources sometimes have to be combined with one another and transported, usually in real time. The requirements in respect of the required data rate have in the meantime accordingly become very high.

Fundamentally, however, the invention is suitable for use for any applications for which the transmission of an electromagnetic wave through a waveguide is relevant.

Features that have already been described in the context of the polarizer according to the invention can of course also advantageously be applied to the waveguide according to the invention, to the systems according to the invention and to the use according to the invention and vice versa. Advantages that have already been mentioned in the context of the polarizer according to the invention can furthermore also be understood with reference to the waveguide according to the invention, or to the systems according to the invention, or to the use according to the invention and vice versa.

It should, in addition, be noted that terms such as "comprising", "having" or "with" do not exclude any other features or steps. Terms such as "a" or "the" that refer in the singular to steps or features do not, furthermore, exclude a plurality of features or steps and vice versa.

SUMMARY

A principal object of the present invention is to provide a polarizer for a waveguide comprising: a base body for the transmission of an electromagnetic wave; a first delay element provided in the base body; a second delay element provided in the base body downstream of the first delay element in a direction of propagation (A) of the electromagnetic wave, and wherein a polarization axis ($P_2$) of the second delay element is rotated through a delay angle ($\beta$) with respect to a polarization axis ($P_1$) of the first delay element; and the first delay element has a cross-section that differs from a cross-section of the base body.

A further object of the present invention is to provide a polarizer wherein the base body has an essentially round cross section.

A further object of the present invention is to provide a polarizer wherein the base body is a dielectric waveguide.

A further object of the present invention is to provide a polarizer wherein one delay element has a cross section that is smaller than the cross section of the base body.

A further object of the present invention is to provide a polarizer wherein one delay element is a single piece with the base body.

A further object of the present invention is to provide a polarizer wherein one delay element is formed of at least one recess, preferably a flattened area in the base body.

A further object of the present invention is to provide a polarizer wherein one delay element is formed of two recesses lying opposite one another along a circumference of the base body, and wherein the two opposing recesses are aligned orthogonally relative to the polarization axis of the delay element.

A further object of the present invention is to provide a polarizer wherein the at least one recess has a first transition region along the direction of propagation of the electromagnetic wave, in which the cross-section of the base body falls, followed by a central region in which the cross-section of the base body is constant, followed by a second transition region in which the cross-section of the base body rises.

A further object of the present invention is to provide a polarizer wherein a length of the first delay element and a length of the second delay element, in the direction of the propagation of the electromagnetic wave, are different from one another.

A further object of the present invention is to provide a waveguide for the transmission of an electromagnetic wave, comprising: a polarizer.

A further object of the present invention is to provide a system for transmission of high-frequency electromagnetic signals, comprising: a waveguide for transmission of an electromagnetic wave; a first antenna arrangement for feeding the electromagnetic wave into a base body of a first polarizer, wherein the first polarizer converts the electromagnetic wave from a linear polarization to a circular polarization; a first delay element provided in the base body of the first polarizer, the first delay element having a polarization axis ($P_1$) that is rotated through a delay angle ($\alpha$) with respect to a polarization axis ($P_L$) of the electromagnetic wave from the first antenna arrangement; and a second delay element provided in the base body of the first polarizer downstream of the first delay element in the direction of propagation (A) of the electromagnetic wave, and wherein a polarization axis ($P_2$) of the second delay element is rotated through a delay angle $\theta 3$) with respect to the polarization axis ($P_1$) of the first delay element.

A further object of the present invention is to provide a system further comprising: a second antenna arrangement for receiving an electromagnetic wave at a base body of a second polarizer; and the second polarizer is downstream of the first polarizer in the direction of propagation (A) of the electromagnetic wave, and the second polarizer converts the electromagnetic wave transmitted through the waveguide from the circular polarization into a linear polarization; and a third delay element provided in the base body of the second polarizer, the third delay element having a polarization axis ($P_3$) that is rotated through 90° with respect to the polarization axis ($P_1$) of the first delay element of the first polarizer; and a fourth delay element provided in the base body of the second polarizer upstream of the third delay element in the direction of propagation (A) of the electromagnetic wave and the fourth delay element has a polarization axis ($P_4$) that is rotated through 90° with respect to the polarization axis ($P_2$) of the second delay element of the first polarizer.

A further object of the present invention is to provide a system wherein a length of one delay element in the direction of propagation (A) of the electromagnetic wave is determined on the delay angle ($\alpha$, $\beta$) of the delay element, and wherein the length of the one delay element falls with a rising delay angle ($\alpha$, $\beta$), preferably in inverse proportion to the delay angle ($\alpha$, $\beta$).

A further object of the present invention is to provide a system wherein the sum of the delay angle ($\alpha$) of the first delay element and the delay angle ($\beta$) of the second delay element results in a total delay angle of 90°, and wherein the delay angle ($\alpha$) of the first delay element is 1° to 45°, preferably 5° to 25°, particularly preferably 15°, and the delay angle ($\beta$) of the second delay element (6) is 1° to 89°, preferably 65° to 85°, particularly preferably 75°.

A further object of the present invention is to provide a system for receiving high-frequency electromagnetic signals, comprising: a waveguide for transmission of an electromagnetic wave; a second antenna arrangement for receiving the electromagnetic wave at a base body of a second polarizer, and wherein the second polarizer converts the electromagnetic wave that is transmitted through the waveguide from a circular polarization to a linear polarization; a third delay element provided in the base body of the second polarizer, and the third delay element has a polarization axis ($P_3$) that is rotated through a delay angle ($\alpha$) with respect to a polarization axis ($P_L$) of the linearly polarized electromagnetic wave emerging from the second polarizer; and a fourth delay element provided in the base body of the second polarizer upstream of the third delay element in the direction of propagation (A) of the electromagnetic wave, and wherein a polarization axis ($P_4$) of the fourth delay element is rotated through a delay angle ($\beta$) with respect to the polarization axis ($P_3$) of the third delay element.

A further object of the present invention is to provide a polarizer for a waveguide wherein the second delay element has a cross-section that differs from the cross-section of the base body.

A further object of the present invention is to provide a polarizer for a waveguide wherein the base body is a hollow waveguide.

A further object of the present invention is to provide a polarizer for a waveguide wherein the base body is a single-wire waveguide.

A still further object of the present invention is to provide a system wherein the sum of the delay angle of the first delay element and the delay angle of the second delay element results in a total delay angle of 90°, and wherein the delay angle of the first delay element is 15°, and the delay angle of the second delay element is 75°.

An even still further object of the present invention is to provide a polarizer wherein one delay element is formed of at least one flattened area in the base body.

These and other objects of the present invention are disclosed herein.

BRIEF DESCRIPTIONS OF THE DRAWINGS

Exemplary embodiments of the invention are described in more detail below with reference to the drawings filed herewith.

The drawing/figures each show preferred exemplary embodiments in which individual features of the present invention are illustrated in combination with one another. Features of one exemplary embodiment can also be implemented when separated from the other features of the same exemplary embodiment and can, accordingly, be combined by a person skilled in the art without difficulty into further useful combinations and subsidiary combinations with features of other exemplary embodiments.

Elements with the same function are given the same reference signs in the figures.

DETAILED WRITTEN DESCRIPTION OF THE PREFERRED EMBODIMENTS

This disclosure of the invention is submitted in furtherance of the Constitutional purposes of the US Patent Laws "to promote the progress of science and useful arts" (Article 1, Section 8).

Figure 1:
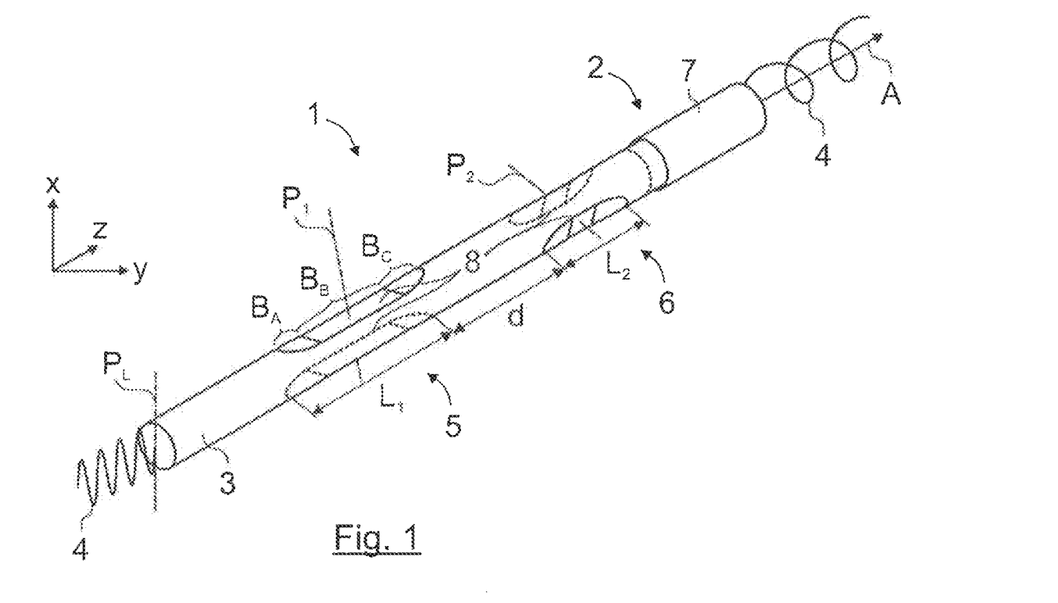
FIG. 1 is an isometric view of a first form of a polarizer according to the invention.
Figure 5:
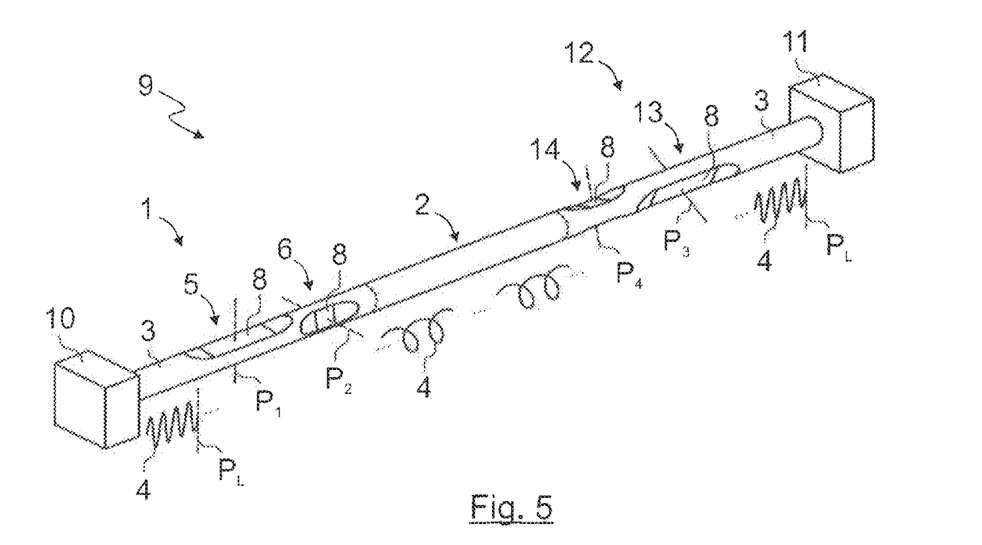
FIG. 5 is an isometric illustration of a system for the transmission of high-frequency electromagnetic signals with a first and a second antenna arrangement, a first and a second polarizer, and a waveguide.

FIG. 1 shows an isometric illustration of a polarizer 1 for a waveguide 2 with a base body 3 for the transmission of an electromagnetic wave 4. The polarizer 1 can be designed as a single piece with the waveguide 2, or as multiple pieces or as a separate component, as is indicated in FIG. 1 and FIG. 5 by dotted lines at the transition between the polarizer 1 and the waveguide 2.

A first delay element 5 is provided in the base body 3, along with a second delay element 6 in the base body 3 downstream of the first delay element 5 in the direction of propagation A of the electromagnetic wave 4 (or in the z-direction in terms of the Cartesian coordinate system shown in FIG. 1). The polarization axis $P_2$ of the second delay element 6 is rotated with respect to the polarization axis $P_1$ of the first delay element 5 through a delay angle β (cf. FIG. 2).

As already explained above, more than two delay elements can also be provided, while the use of the two delay elements 5, 6 described here is particularly preferred.

The base body 3 has an essentially round cross-section. Fundamentally, however, the cross-section of the base body 3 can be arbitrary; preferably the cross-section of the base body 3 corresponds to the cross-section of the waveguide 2.

It can be provided that the base body 3 is designed as a dielectric waveguide, hollow waveguide or single-wire waveguide. In the exemplary embodiment, the base body 3 is formed as a dielectric waveguide that can optionally be surrounded by a metal cylinder 7. The metal cylinder 7 is only suggested for illustration purposes in FIG. 1, and indeed only in the region of the waveguide 2.

In particular, it can be provided that the first delay element 5 and/or the second delay element 6 has, or have, a cross-section that differs from the cross-section of the base body 3, preferably being smaller. In the exemplary embodiment, the delay elements 5, 6 are formed as a single piece with the base body 3.

The delay elements 5, 6 can each be formed of at least one recess, preferably a flattened area 8, in the base body 3. In the exemplary embodiment according to FIGS. 1 to 5, the delay elements 5, 6 are each formed of two flattened areas located opposite one another along the circumference of the base body 3, wherein the two opposing flattened areas 8 are aligned orthogonally to the polarization axis $P_1$, $P_2$ of the respective delay element 5, 6.

It should be mentioned that fundamentally an arbitrary number of recesses or flattened areas 8 can be provided for each delay element 5, 6.

It is moreover provided in the exemplary embodiment that the at least one recess or flattened area 8 has a first transition region $B_A$ along the direction of propagation A of the electromagnetic wave 4, in which the cross-section of the base body 3 falls, followed by a central region $B_B$ in which the cross-section of the base body 3 is constant, followed by a second transition region $B_C$ in which the cross-section of the base body 3 rises again. A consistent transition, and thus a better match of the polarizer 1 to the cross-section changes, can hereby be enabled, in particular (although not exclusively) when a dielectric base body 3 is used. For the sake of simplicity, the regions $B_A$, $B_B$, $B_C$ are indicated only for the first delay element 5 in FIG. 1. The use of transition regions $B_A$, $B_C$ is optional, and can also be omitted, in particular (although not exclusively) when a metal base body 3 is used.

As can be seen in the exemplary embodiments, the length $L_1$ (cf. FIG. 1) of the first delay element 5 and the length $L_2$ of the second delay element 6 in the direction of propagation A of the electromagnetic wave 4 are different from one another. Fundamentally, however, the lengths $L_1$, $L_2$ of the delay elements 5, 6 can also be identical, in particular when the delay angles α and β, yet to be described below, correspond.

It can be provided that the delay elements 5, 6 are spaced apart from one another. The distance d (cf. FIG. 1) between the delay elements 5, 6 is not, however, important.

As shown schematically in FIG. 1, the polarizer 1 can preferably be used to convert a linearly polarized electromagnetic wave 4 into a circularly polarized electromagnetic wave 4, or at least an elliptically polarized electromagnetic wave 4, which can then be transmitted through the waveguide 2. The polarization axis $P_1$ of the first delay element 5 can be rotated for this purpose with respect to the polarization access $P_L$ of the electromagnetic wave 4 that is fed in by a delay angle α. Through a polarization axis $P_2$ of the second delay element 6 rotated further relative to the polarization axis $P_L$ of the electromagnetic wave 4 that is fed in and the polarization axis $P_1$ of the first delay element 5, the polarization type of the electromagnetic wave 4 can ultimately be converted to the circular polarization.

The direction of rotation of the circular polarization that is generated is, in the exemplary embodiment, right-circular, since the excitation of the linear polarization of the incoming electromagnetic wave 4 is aligned in the x-direction. On the other hand, a linear polarization rotated through 90°, i.e. an excitation in the y-direction of the incoming electromagnetic wave 4, would, with the same configuration of the polarizer 1, have a left-circular polarization as a consequence. The rotation direction of the circular polarization can thus be determined through the alignment of the linear polarization of the incoming electromagnetic wave 4 and the alignment or arrangement of the delay elements 5, 6.

The length $L_1$ of the first delay element 5 or the length $L_2$ of the second delay element 6 in the direction of propagation A of the electromagnetic wave 4 can be determined depending on the delay angle α or β of the respective delay element 5, 6, wherein the length $L_1$, $L_2$ of the delay elements 5, 6 can fall with rising delay angle α, β, preferably being in inverse proportion to the delay angle α, β.

It can in particular be provided that the sum of the delay angle α of the first delay element 5 and the delay angle β of the second delay element 6 results in a total delay angle of 90°, wherein the delay angle α of the first delay element 5 is 1° to 45°, preferably 5° to 25°, and particularly preferably 15° (as illustrated in the exemplary embodiment), and the delay angle β of the second delay element 6 is 1° to 89°, preferably 65° to 85°, and particularly preferably 75° (as illustrated in the exemplary embodiment).

Figure 2:
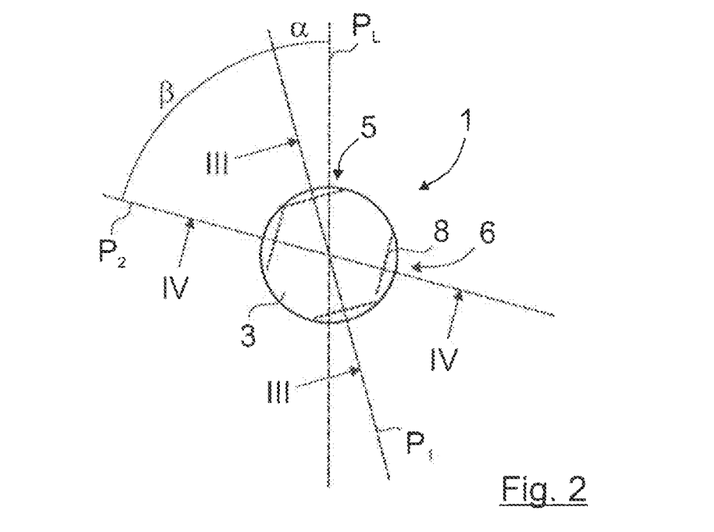
FIG. 2 is a cross-sectional view of a second form of the polarizer according to the invention.

The relationships between the polarization axes $P_1$, $P_2$, $P_L$ and the delay angles α, β are further clarified in FIG. 2. FIG. 2 shows a cross-section of a further polarizer 1 in this connection.

Figure 3:
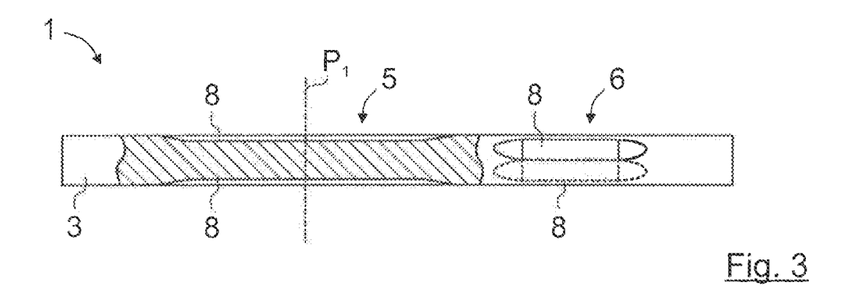
FIG. 3 is a partial cutaway view of the polarizer of FIG. 2 taken on line of FIG. 2.

For further clarification, FIG. 3 shows a partly cutaway side view of the polarizer 1 of FIG. 2 along the cut plane illustrated in FIG. 2, whose structure corresponds fundamentally to the structure of the polarizer 1 of the exemplary embodiment of FIG. 1, wherein, however, the distance d between the first delay element 5 and the second delay element 6 is different. As already explained, however, the distance d between the delay elements 5, 6 is not important.

Figure 4:
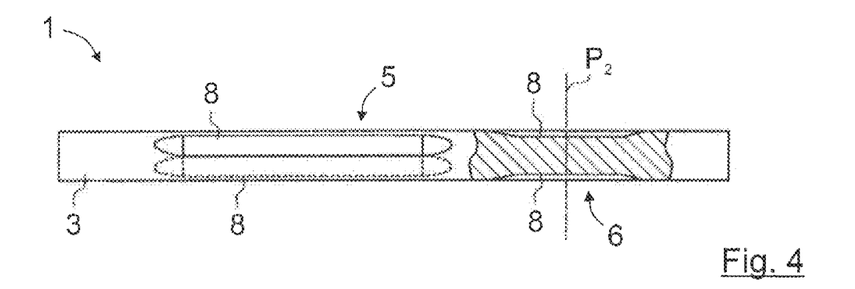
FIG. 4 is a partial cutaway view of the polarizer of FIG. 2 taken on line IV-IV of FIG. 2.

FIG. 4 shows a further partial view of the polarizer 1 of FIG. 2 along the cut plane IV-IV illustrated in FIG. 2.

A system 9 for the transmission of high-frequency electromagnetic signals that comprises a waveguide 2 for the transmission of an electromagnetic wave 4 and a first antenna arrangement 10 for feeding the electromagnetic wave 4 into a base body 3 of a first polarizer 1 is illustrated in FIG. 5. The first polarizer 1 is arranged between the first antenna arrangement 10, which is only illustrated schematically as a box, and the waveguide 2, and is designed to convert the electromagnetic wave 4 that is fed in from a linear polarization to a circular polarization (or at least to an elliptical polarization). A first delay element 5 is provided here in the base body 3 of the first polarizer 1, whose polarization axis $P_1$ is rotated through a delay angle α with respect to the polarization axis $P_L$ of the electromagnetic wave 4 fed in to the base body 3 from the first antenna arrangement 10, as already illustrated in FIGS. 1 and 2. It is further provided that a second delay element 6 is arranged downstream of the first delay element 5 in the direction of propagation A of the electromagnetic wave 4 in the base body 3, wherein the polarization axis $P_2$ of the second delay element 6 is rotated through a delay angle β with respect to the polarization axis $P_1$ of the first delay element 5.

A system, complementary to the above explanations, for receiving high-frequency electromagnetic signals can fundamentally also be provided, comprising a waveguide 2 for the transmission of an electromagnetic wave 4 and a second antenna arrangement 11 (also only illustrated schematically as a box) for receiving the electromagnetic wave 4 at a base body 3 of a second polarizer 12 that is arranged between the waveguide 2 and the second antenna arrangement 11. The second polarizer 12 is designed to convert the electromagnetic wave that is transmitted through the waveguide 2 from the circular polarization (or elliptical polarization) to a linear polarization, wherein a third delay element 13 is provided in the base body 3 of the second polarizer 12, whose polarization axis $P_3$ is rotated through a delay angle α with respect to the polarization axis $P_L$ of the linearly polarized electromagnetic wave 4 emerging from the second polarizer 12. It can further be provided that a fourth delay element 14 can be provided in the base body 3 of the second polarizer 12 upstream of the third delay element 13 in the direction of propagation A of the electromagnetic wave 4, wherein the polarization axis $P_4$ of the fourth delay element 14 is rotated through a delay angle β with respect to the polarization axis $P_3$ of the third delay element 13.

The system 9 shown in FIG. 5 corresponds to an advantageous combination, and comprises the first antenna arrangement 10, the second antenna arrangement 11 and the two polarizers 1, 12. The polarization axis $P_3$ of the third delay element 13 in the base body 3 of the second polarizer 12 is here rotated through 90° with respect to the polarization axis $P_1$ of the first delay element 5 of the first polarizer 1. Further, the polarization axis $P_4$ of the fourth delay element 14 of the second polarizer 12 is here also rotated through 90° with respect to the polarization axis $P_2$ of the second delay element 6 of the first polarizer 1.

In order to transmit an electromagnetic wave 4 using the first antenna arrangement 10 to generate a linearly polarized electromagnetic wave 4 to the second antenna arrangement 11 for receiving a linearly polarized electromagnetic wave 4 in circular polarization through the waveguide 2, the two polarizers 1, 12 can thus be applicable, wherein the first polarizer 1 first generates a circularly polarized electromagnetic wave 4 from the linearly polarized electromagnetic wave 4, feeds this into the waveguide 2 or is designed as a single piece with the waveguide 2 and wherein the second polarizer 12 is arranged mirrored with respect to the first polarizer 1 along the direction of propagation A of the electromagnetic wave 4 and rotated through 90°, and accepts the circularly polarized electromagnetic wave 4 out of the waveguide 2—or is designed as a single piece with the waveguide 2—and converts it to a linearly polarized electromagnetic wave 4 in order to be received by the subsequent second antenna arrangement 11.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:
1. A polarizer for a waveguide comprising:
a base body for the transmission of an electromagnetic wave;
a first delay element provided in the base body:

a second delay element provided in the base body downstream of the first delay element in a direction of propagation of the electromagnetic wave, and wherein a polarization axis of the second delay element is rotated through a delay angle with respect to a polarization axis of the first delay element, and at least one of the first delay element, or the second delay element, has a cross-section that differs from a cross-section of the base body; and the base body is a dielectric waveguide.

2. The polarizer as claimed in claim 1, and wherein the base body has an essentially round cross section.

3. The polarizer as claimed in claim 1 and wherein one delay element has a cross section that is smaller than the cross section of the base body.

4. The polarizer as claimed in claim 1 and wherein one delay element is a single piece with the base body.

5. The polarizer as claimed in claim 1 and wherein one delay element is formed of at least one recess, preferably a flattened area in the base body.

6. The polarizer as claimed in claim 5 and wherein the at least one recess has a first transition region along the direction of propagation of the electromagnetic wave, in which the cross-section of the base body falls, followed by a central region in which the cross-section of the base body is constant, followed by a second transition region in which the cross-section of the base body rises.

7. The polarizer as claimed in claim 1 and wherein one delay element is formed of two recesses lying opposite one another along a circumference of the base body, and wherein the two opposing recesses are aligned orthogonally relative to the polarization axis of the delay element.

8. The polarizer as claimed in claim 1 and wherein a length of the first delay element and a length of the second delay element, in the direction of the propagation of the electromagnetic wave, are different from one another.

9. The polarizer as claimed in claim 1 and wherein the base body is a hollow waveguide.

10. The polarizer as claimed in claim 1 and wherein the base body is a single-wire waveguide.

11. The polarizer as claimed in claim 1 and wherein one delay element is formed of at least one flattened area in the base body.

12. A system for transmission of high-frequency electromagnetic signals, comprising:

a waveguide for transmission of an electromagnetic wave;

a first antenna arrangement for feeding the electromagnetic wave into a base body of a first polarizer, wherein the first polarizer converts the electromagnetic wave from a linear polarization to a circular polarization:

a first delay element provided in the base body of the first polarizer, the first delay element having a polarization axis that is rotated through a delay angle (a) with respect to a polarization axis of the electromagnetic wave from the first antenna arrangement; and a second delay element provided in the base body of the first polarizer downstream of the first delay element in the direction of propagation of the electromagnetic wave, and wherein a polarization axis of the second delay element is rotated through a delay angle ($\beta$) with respect to the polarization axis of the first delay element; and the base body is a dielectric waveguide.

13. The system as claimed in claim 12, and further comprising:

a second antenna arrangement for receiving an electromagnetic wave at a base body of a second polarizer; and the second polarizer is downstream of the first polarizer in the direction of propagation of the electromagnetic wave, and the second polarizer converts the electromagnetic wave transmitted through the waveguide from the circular polarization into a linear polarization; and a third delay element provided in the base body of the second polarizer, the third delay element having a polarization axis that is rotated through 90° with respect to the polarization axis of the first delay element of the first polarizer; and a fourth delay element provided in the base body of the second polarizer upstream of the third delay element in the direction of propagation of the electromagnetic wave and the fourth delay element has a polarization axis that is rotated through 90° with respect to the polarization axis of the second delay element of the first polarizer.

14. The system of claim 13 and wherein a length of one delay element in the direction of propagation of the electromagnetic wave is determined on the delay angle ($\alpha$, $\beta$) of the delay element, and wherein the length of the one delay element falls with a rising delay angle ($\alpha$, $\beta$), preferably in inverse proportion to the delay angle ($\alpha$, $\beta$).

15. The system as claimed in claim 14 and wherein the sum of the delay angle ($\alpha$) of the first delay element and the delay angle ($\beta$) of the second delay element results in a total delay angle of 90°, and wherein the delay angle ($\alpha$) of the first delay element is 1° to 45°, and the delay angle ($\beta$) of the second delay element is 1° to 89°.

16. The system as claimed in claim 14 and wherein the sum of the delay angle of the first delay element and the delay angle of the second delay element results in a total delay angle of 90°, and wherein the delay angle of the first delay element is 15°, and the delay angle of the second delay element is 75°.

17. A system for receiving high frequency electromagnetic signals, comprising:

a waveguide for transmission of an electromagnetic wave;

a second antenna arrangement for receiving the electromagnetic wave at a base body of a second polarizer, and wherein the second polarizer converts the electromagnetic wave that is transmitted through the waveguide from a circular polarization to a linear polarization;

a third delay element provided in the base body of the second polarizer, and the third delay element has a polarization axis that is rotated through a delay angle ($\alpha$) with respect to a polarization axis of the linearly polarized electromagnetic wave emerging from the second polarizer; and a fourth delay element provided in the base body of the second polarizer upstream of the third delay element in the direction of propagation of the electromagnetic wave, and wherein a polarization axis of the fourth delay element is rotated through a delay angle ($\beta$) with respect to the polarization axis of the third delay element.

18. The polarizer for a waveguide of claim 1 and wherein the second delay element has a cross-section that differs from the cross-section of the base body.

* * * * *

UNITED STATES PATENT AND TRADEMARK OFFICE
CERTIFICATE OF CORRECTION

| | | |
|---|---|---|
| PATENT NO. | : 12,170,393 B2 | Page 1 of 1 |
| APPLICATION NO. | : 17/049540 | |
| DATED | : December 17, 2024 | |
| INVENTOR(S) | : Raimund Klapfenberger | |

It is certified that error appears in the above-identified patent and that said Letters Patent is hereby corrected as shown below:

On the Title Page

Item (71) Applicant should be Rosenberger Hochfrequenztechnik GmbH & Co. KG.

Signed and Sealed this
Fourth Day of March, 2025

Coke Morgan Stewart
*Acting Director of the United States Patent and Trademark Office*